United States Patent [19]

Jewison et al.

[11] 4,331,397

[45] May 25, 1982

[54] FRONT/REAR PROJECTION SYSTEM

[75] Inventors: Charles B. Jewison, Batavia; Brian E. Buck, Bartlett, both of Ill.

[73] Assignee: Dukane Corporation, St. Charles, Ill.

[21] Appl. No.: 186,306

[22] Filed: Sep. 11, 1980

[51] Int. Cl.³ .......................................... G03B 21/22
[52] U.S. Cl. ...................................... 353/71; 353/82; 353/87; 353/101
[58] Field of Search ....................... 353/82, 34, 71, 48, 353/49, 87, 101, 119, 95; 352/104, 142

[56] References Cited

U.S. PATENT DOCUMENTS

| | | | |
|---|---|---|---|
| 1,176,485 | 3/1916 | Ott | 353/64 |
| 3,387,535 | 6/1968 | Bennett | 353/71 |
| 3,582,195 | 6/1971 | Pignone | 352/1 |
| 3,885,868 | 5/1975 | Hadzimihalis | 353/71 |
| 3,899,246 | 8/1975 | Edestein | 353/27 |
| 4,092,063 | 5/1978 | Koester | 353/71 |
| 4,111,537 | 9/1978 | Wells et al. | 353/101 |
| 4,139,283 | 2/1979 | Cook | 352/104 |
| 4,156,561 | 5/1979 | Lucas | 353/38 |
| 4,163,610 | 8/1979 | Sanderson | 353/71 |

FOREIGN PATENT DOCUMENTS

| | | | |
|---|---|---|---|
| 425646 | 2/1926 | Fed. Rep. of Germany | 353/82 |
| 20122 | 11/1909 | Norway | 353/34 |
| 26431 | of 1911 | United Kingdom | 353/82 |

Primary Examiner—Harry N. Haroian
Attorney, Agent, or Firm—Dithmar, Stotland, Stratman & Levy

[57] ABSTRACT

A filmstrip viewer/projector unit includes two separate projection lenses, one for front projection on a remote screen and the other for rear projection on a small local viewing screen built into the unit. A film carrier has two separate apertures therein respectively disposed in optical alignment with the two projection lenses for cooperation therewith to define first and second optical axes. A lamp directs a beam of light to a plane mirror disposed between the lamp and the film carrier and movable between two positions for respectively reflecting the beam of light along the first and second optical axes, respectively for projecting the film image onto the associated remote and local screens. First and second condenser lenses are respectively disposed along the optical paths between the reflector and the film carrier. The projection lenses share a common focusing mechanism.

22 Claims, 9 Drawing Figures

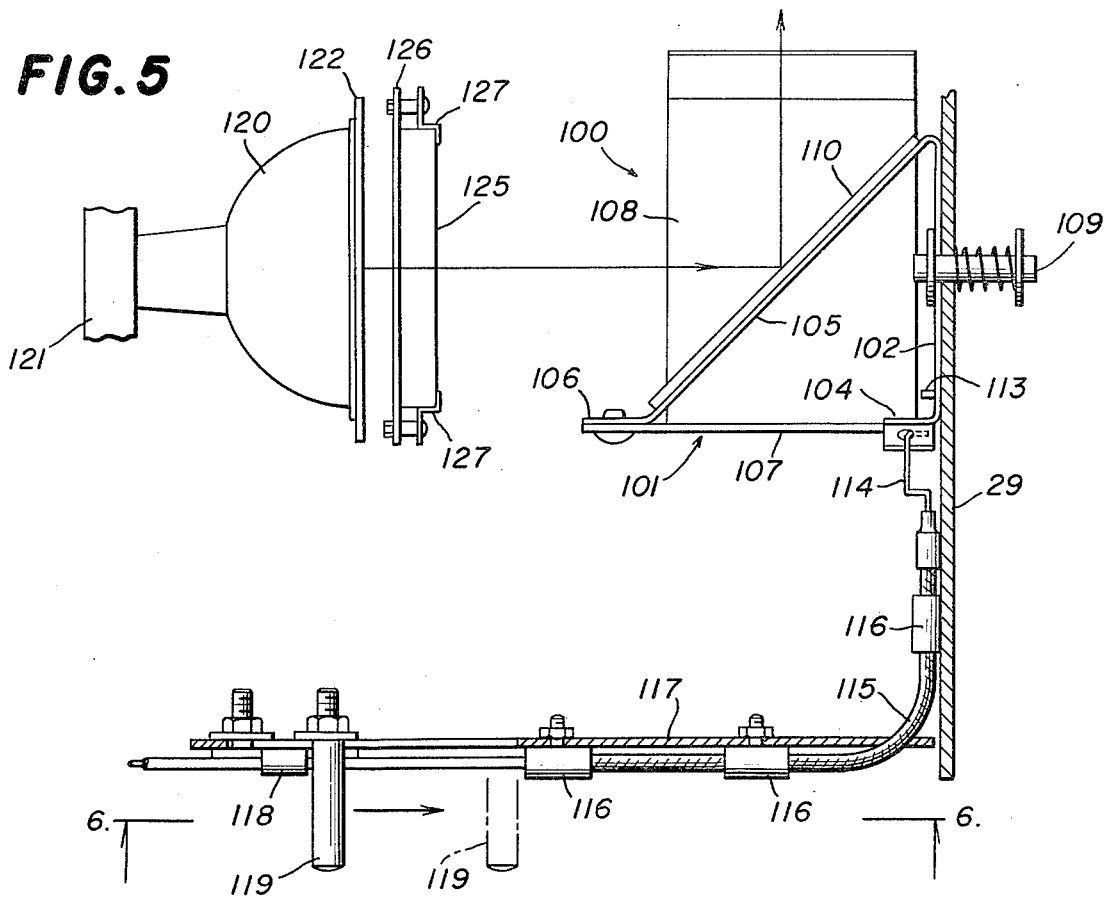
FIG.5
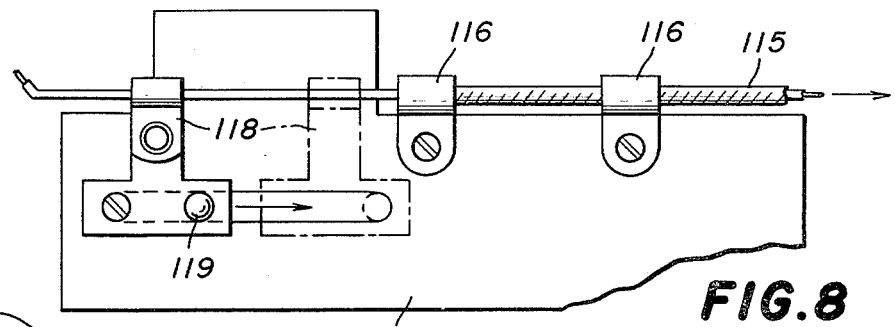
FIG.6
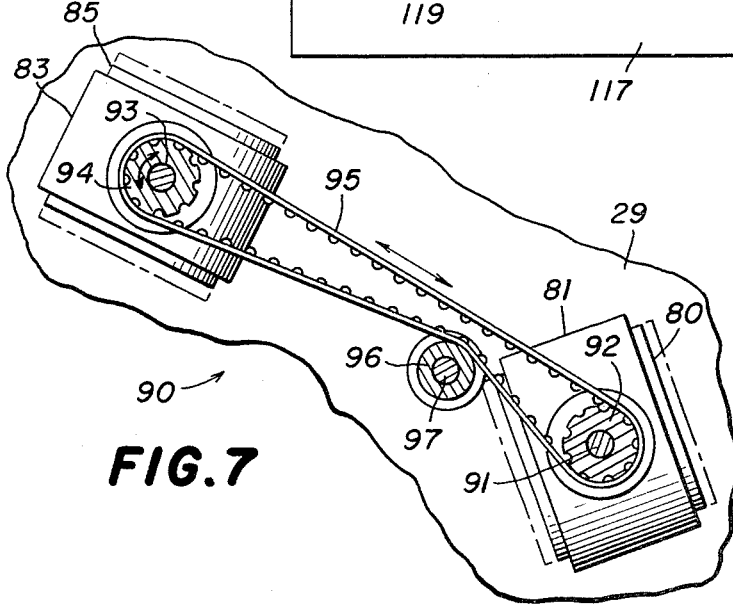
FIG.7
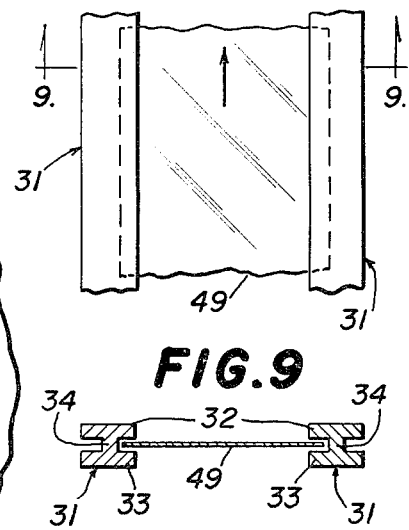
FIG.8
FIG.9

FRONT/REAR PROJECTION SYSTEM

The present invention relates to audiovisual devices for projecting film images alternatively along different projection paths. More specifically, the present invention relates to an apparatus for projecting filmstrip images alternatively onto the front of a screen remote from the apparatus or the rear of a small local viewing screen built into the apparatus.

Such dual-purpose projection devices which have been previously available have been characterized by a single projection system, including a projection lens, a film aperture and perhaps other associated optical elements. The alternative types of projection were sometimes achieved by shifting the entire projection system between two different optical axes, as in U.S. Pat. No. 4,092,063. The same result was sometimes achieved by positioning a reflector between the projection lens and the viewing screens and moving the reflector. More specifically, the reflector could be moved between first and second reflecting positions for shifting the reflected image between the two screens, or between an image-reflecting position for directing it to one screen and an image-passing or non-reflecting position for allowing the image to pass to the other screen, an example of the latter type of system being disclosed in U.S. Pat. No. 4,163,610.

Because these prior devices utilize a single projection system, the optical components thereof can be optimized for the requirements of either the small local viewing screen or the large remote viewing screen, but not for both, since the requirements of the two projection modes are quite different. Typically, the projection system will be optimized for neither viewing screen, but will rather be a compromise between the two. Thus, it is difficult in the prior systems to achieve optimum image quality on both the local and the remote viewing screens. It is possible to design projection systems which can approach the requirements for both remote and local projection modes, but such systems are prohibitively expensive.

Furthermore, the movable components of such prior projection systems are quite massive, thereby necessitating expensive and complicated mechanism for effecting movement thereof. Thus, in the devices wherein the entire projection system is shifted, an assembly including projection lens, condenser lens, film carrier and perhaps other elements must all be shifted. Even in those systems which move only a mirror, the mirror is located between the projection lens and the screen and is typically relatively large and heavy. In addition, because the movable mirror is located between the projection lens and the screen, it must typically be moved a relatively large distance between the two projection positions and the accurate positioning of the mirror in its reflecting positions becomes quite critical in order to achieve proper alignment of the image on the screen. These needs for movement of a relatively massive mirror through a relatively large distance between critically defined positions necessitates complicated and expensive movement mechanism.

SUMMARY OF THE INVENTION

The present invention relates to an improved apparatus for projecting a film image alternatively onto a remote surface and a built-in screen, which apparatus avoids the disadvantages of prior art devices while affording additional structural and operational advantages.

It is a general object of the present invention to provide an improved projection apparatus which affords simple and economical construction, while at the same time providing optimized image projection onto remote and built-in screens.

It is another object of this invention to provide a projection apparatus of the type set forth, which includes a single, relatively low-mass, movable member for effecting shifting of the projected image between the two screens.

In connection with the foregoing object, it is another object of this invention to provide a projection apparatus of the type set forth, wherein the movable member is adapted for movement a relatively short distance between two non-critical positions.

Still another object of this invention is the provision of an improved projection apparatus of the type set forth, wherein the only movable member is a reflector disposed between the light source and the projection apertures.

Still another object of this invention is the provision of an improved projection apparatus of the type set forth, which includes two separate projection lens systems respectively optimized for projecting images onto the two different screens.

In connection with the foregoing object, it is another object of this invention to provide a projection apparatus of the type set forth which includes a film carrier having two separate apertures respectively associated with the two projection lens systems.

These and other objects of the invention are attained by providing apparatus for projecting a film image alternatively onto a remote surface and a built-in screen, the apparatus comprising a light source, first and second non-coaxial projection lenses, and a film carrier disposed between the light source and the projection lenses and having first and second apertures therethrough respectively optically aligned with the first and second projection lenses for cooperation therewith respectively to define first and second optical paths therethrough, light from the light source traveling along the first optical path for projection onto the associated remote surface and traveling along the second optical path for projection onto the associated built-in screen.

Further features of the invention pertain to the particular arrangement of the parts of the projection apparatus whereby the above-outlined and additional operating features thereof are attained.

The invention, both as to its organization and method of operation, together with further objects and advantages thereof, will be understood by reference to the following specification taken in connection with the accompanying drawings.

BRIEF DESCRIPTION OF THE DRAWINGS

FIG. 5 is a view taken along the line 5—5 in FIG. 4, and illustrating the movable reflector mechanism and associated lamp of the present invention;

FIG. 6 is a fragmentary side elevational view taken along the line 6—6 in FIG. 5, and illustrating a portion of the control linkage for the movable reflector;

FIG. 7 is a fragmentary elevational view of the projection lenses of FIG. 4 and the focusing mechanism therefor;

FIG. 8 is a fragmentary elevational view of the film carrier of the present invention, taken along the line 8—8 in FIG. 4; and FIG. 9 is a cross-sectional view taken along the line 9—9 in FIG. 8.

DESCRIPTION OF THE PREFERRED EMBODIMENT

Figure 1:
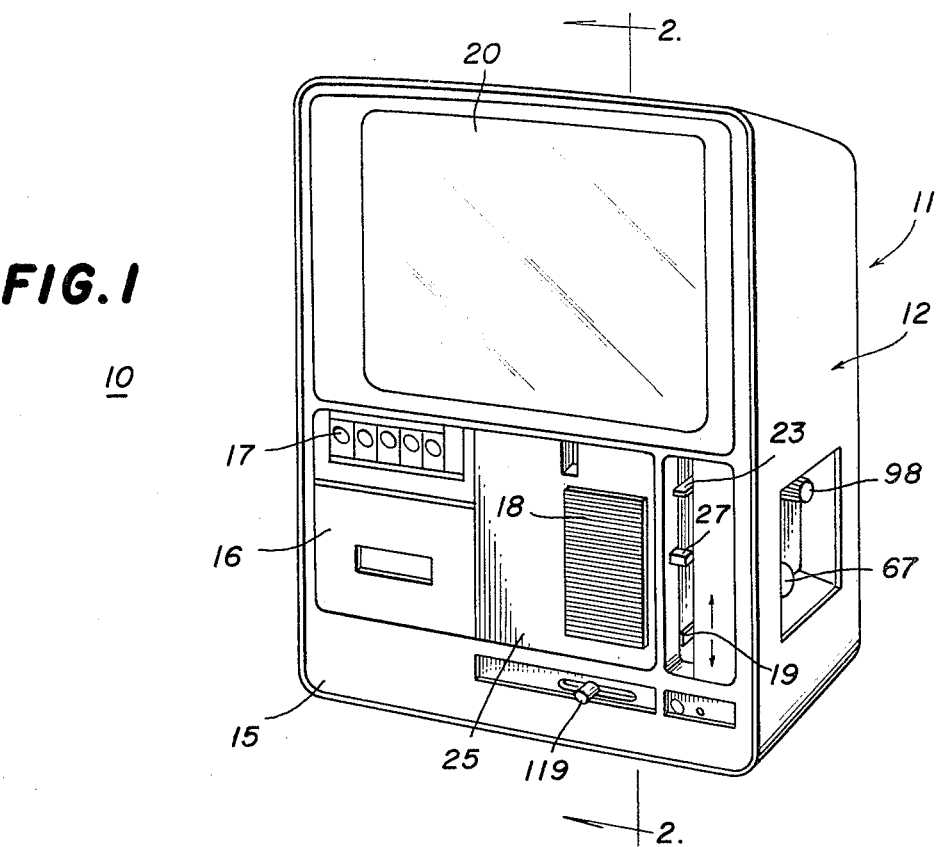
FIG. 1 is a front perspective view of a filmstrip viewer/projector constructed in accordance with and embodying the features of the present invention.

Referring now to FIGS. 1 through 4 of the drawings, there is illustrated a projector, generally designated by the numeral 10, which includes projection apparatus constructed in accordance with and embodying the features of the present invention. The projector 10 has a housing, generally designated by the numeral 11, whih includes a box-like open-front casing 12 which may integrally be formed of molded plastic or the like and has a bottom wall 13 and a rear wall 14, the front of the casing 12 being closed by a generally rectangular front panel 15. Preferably, the projector 10 is an audiovisual device for projecting sound filmstrips. More specifically, the filmstrip is of the single frame type, preferably thirty-five millimeter, although other film sizes may be used, and is adapted to be accompanied by a sound program preferably recorded on a magnetic tape cassette, which includes a cue signal for controlling automatic advancement of the filmstrip in synchronization with the tape cassette. But it will be appreciated that the present invention is adapted for use with any type of film format, with or without accompanying sound.

The front panel 15 includes a cassette loading door 16 which folds down to permit loading of the cassette thereinto, control of the cassette being effected by a set of control keys 17. A speaker is mounted behind a speaker grille 18 on the front panel 15, volume control being effected by a control lever 19. Mounted in the upper half of the front panel 15 is a small rear projection viewing screen 20.

Projecting from the bottom wall 13 of the casing 12 are four support legs 21 adjacent to the corners and an elevation leg 22 which is adjustable in length for elevating and lowering the front of the projector 10 for a purpose to be explained more fully below. Also mounted on the front panel 15 are controls for the projection apparatus of the present invention, including a lamp and audio power switch 23 and a filmstrip drive control switch 27. A film loading door 25 is mounted on the front panel 15 and is adapted to pivot down to permit loading of a filmstrip into the projector 10. More specifically, the spool of film is loaded into a film supply holder 26 mounted on the inside of the loading door 25, for feeding into the projection apparatus. Mounted in the upper rear portion of the housing 11 is a mirror 28 (see FIGS. 2 and 3) for projecting images onto the rear of the viewing screen 20, as will be explained more fully below.

Referring in particular to FIGS. 2 through 4, 8 and 9 of the drawings, the projection apparatus of the present invention includes a film carrier assembly, generally designated by the numeral 30, which is mounted on a flat support plate 29 (see FIG. 5) disposed vertically within the housing 11. The film carrier assembly 30 includes two identically-constructed carrier members 31, spaced apart a predetermined distance for cooperation to define therebetween a path, generally designated by the arrows 45 for the associated filmstrip 49, the path 45 having at least two generally straight-line sections disposed at a predetermined angle with respect to each other.

Each of the carrier members 31 comprises an elongated member, preferably integrally formed of molded plastic and including inner and outer spaced-apart parallel rails 32 and 33 interconnected by a web 34 for cooperation therewith to define a channel for receiving and guiding the adjacent side edge of the associated filmstrip 49. The outer rail 33 is provided at one end thereof with an elongated entry flange 35 which extends parallel to the door 25 along the inner side thereof and cooperates therewith to define an entry path from the film supply holder 26 to the channels of the carrier members 31, the entry flange 35 preferably being connected to the main portion of the inner rails 32 by a stiffening web 36. Projecting from the opposite end of the inner rail 32 is an ear 38. Projecting laterally from the outer rail 33 intermediate the ends thereof is an elongated coupling web 37 provided with a cylindrical bushing 39.

As is best seen in FIGS. 8 and 9, the carrier members 31 are arranged in horizontally congruent relationship and are spaced apart by cylindrical spacers 41 and 42 respectively (see FIG. 4) disposed between the stiffening webs 36 and the ears 38, the spacers 41 receiving therethrough suitable fasteners 43 for holding the carrier members 31 together securely to fasten the film carrier assembly 30 to the support plate 29. Mounted between the entry flanges 35 of the carrier members 31 is a flat rectangular entry guide plate 40 disposed parallel to the front panel door 25. A mounting pin 44 extends through the aligned bushings 39 and is secured to the support plate 29 for mounting and stabilizing the central portion of the film carrier assembly 30, the assembly being further secured to the plate 29 by a screw 44a through the web 36 of the adjacent carrier member 31. Secured to the inner end of the inner rails 32 and extending therefrom as an arcuate continuation thereof if a take-up holder 46 for receiving and coiling the filmstrip into a take-up roll.

Respectively formed in the two straight-line sections of each carrier member 31 are two rectangular gate recesses 47. Similarly, formed directly opposite the gate recesses 47 in each of the outer rails 33 are two gate recesses 48. It will be appreciated from FIG. 4 that the filmstrip path 45 extends from the supply holder downwardly across the front surface of the entry guide plate 40 and then into the film carrier assembly 30 and therealong to the take-up holder 46, the opposite side edges of the filmstrip 49 being respectively received in the channels formed by the rails 32 and 33 of the carrier members 31.

Mounted between the carrier members 31 and in the gate recess 48 thereof nearest the take-up holder 46 is a rectangular aperture gate 50 having a rectangular flange 51 projecting from the entry side thereof along the path 45. Mounted between the carrier members 31 in the gate recesses 47 thereof immediately opposite the aperture gate 50 is a rectangular aperture gate 52 having a short flange 53 extending from the exit side thereof along the path 45, and being resiliently held in place by a pair of spring clips 54. The aperture gates 50 and 52 cooperates to define a rectangular aperture 55 through the film carrier assembly 30.

In like manner, a rectangular aperture gate 56 is mounted between the carrier members 31 in the outer gate recesses 48 thereof closest to the supply holder 26, the aperture gate 56 having a rectangular flange 57 projecting from the entry end thereof along the path 45. Mounted between the carrier members 31 in the inner gate recesses 47 thereof directly opposite the aperture gate 56 is a rectangular aperture gate 58 having a short flange 59 projecting from the exit end thereof along the path 45, and being resiliently held in place by spring clips 54. The aperture gates 56 and 58 cooperate to define a rectangular aperture 60 through the film carrier assembly 30.

It will be appreciated that the filmstrip path 45 passes between the aperture gates 56 and 58 and between the aperture gates 50 and 52, the minimum separation between the aperture gates 50 and 52 and between the aperture gates 56 and 58 being only slightly greater than the thickness of the filmstrip 49, accurately to position the filmstrip 49 in the apertures 55 and 60 for passage of a light beam therethrough, as will be described below. The spring clips 54 permit slight movement of the aperture gates 52 and 58 away from the aperture gates 50 and 56 to accommodate passage of thick filmstrip portions occasioned by splices, creases and the like.

Respectively mounted adjacent to the inner rails 32 of the carrier members 31 are two drive sprockets 61 (one shown) mounted for rotation on a common shaft 62 carried by the support plate 29. The teeth of the drive sprocket 61 respectively project through notches 63 in the inner rails 32 of the carrier members 31 for engagement with the edge perforations of the filmstrip 49. Respectively carried on journals on the coupling webs 37 of the carrier members 31 are two recovery sprockets 64 (one shown), mounted for rotation on a common shaft 65 which passes through complementary openings in the coupling webs 37 and is slaved off the drive shaft 62 through a unidirectional clutch and slip coupling (not shown). The teeth of the recovery sprockets 64 project through notches 66 in the outer rails 33 of the carrier members 31 for engagement with the edge perforations of the filmstrip 49. The shaft 62 is coupled to associated drive mechanism (not shown) for indexing the filmstrip one frame at a time in response to cue signals from the sound cassette. The shaft 62 projects through the side of the housing 11 and is connected to a framing knob 67 for manual rotation of the shaft 62 and the sprockets 61 for framing of the filmstrip 49 and for rotation of the slaved recovery sprockets 64 to recover the trailing end of the filmstrip when it has been driven past the drive sprockets 61.

Mounted on the support plate 29 adjacent to the inner rails 32 of the film carrier assembly 30 is a condenser lens bracket, generally designated by the numeral 70, which includes two substantially rectangular plates 71 and 72 extending from the support plate 29 substantially normal thereto and respectively disposed substantially parallel to the straight line sections of the filmstrip path 45 in which the apertures 55 and 60 are located. Respectively extending from the bottom edges of the plates 71 and 72 are two attachment flanges 73 which are fixedly secured to the support plate 29 by suitable fasteners 74. Each of the plates 71 and 72 has a circular opening therein for respectively receiving condenser lenses 75 and 76, which are held in place by suitable mounting clips (not shown). The condenser lens 75 is arranged in optical alignment with the aperture 55 and is preferably a biconvex lens, while the condenser lens 76 is arranged in optical alignment with the aperture 60 and is preferably an aspheric lens. A diffuser 79 may be provided in optical alignment with the condenser lens 76.

Also mounted on the support plate 29 are two projection lenses, respectively generally designated by the numerals 80 and 85. The projection lens 80 is disposed for axial movement within a mounting sleeve 81 provided with two attachment flanges 82 which are secured by suitable fasteners to the support plate 29. In like manner, the projection lens 85 is disposed for axial movement within a mounting sleeve 83 having attachment flanges 84 secured to the mounting plate 29. The projection lens 80 is disposed substantially coaxially with the condenser lens 75 along an optical axis 86, while the projection lens 85 is disposed coaxially with the condenser lens 76 along an optical axis 87.

Referring now also to FIG. 7 of the drawings, there is illustrated a focusing mechanism, generally designated by the numeral 90, for the projection lenses 80 and 85. The focusing mechanism 90 includes a shaft 91 which extends radially outwardly from the mounting sleeve 81, the inner end of the shaft 91 being coupled to a suitable wellknown mechanism for effecting continuous back and forth axial movement of the projection lens 80 in response to rotation of the shaft 91, and the outer end of the shaft 91 being fixedly secured to a sprocket 92. In like manner, a shaft 93 extends radially outwardly from the mounting sleeve 83, the inner end of the shaft 93 being coupled to suitable mechanism for effecting continuous back and forth axial movement of the projection lens 85 in response to rotation of the shaft 93, and the outer end of the shaft 93 being fixedly secured to a sprocket 94. Interconnecting the sprockets 92 and 94 is a timing belt 95, the outer surface of which is preferably disposed in engagement with a tension-adjusting device 96 secured by a fastener 97 to a bracket carried by the mounting sleeve 81. Preferably, the shaft 93 extends outwardly through a complementary opening in the side of the housing 11 and is there connected to a focus knob 98 (see FIG. 1) for manual operation of the focus mechanism 90. More specifically, it will be appreciated that as the shaft 93 is rotated, the projection lenses 80 and 85 simultaneously undergo axial focusing movements. Thus, both of the projection lenses 80 and 85 may be focused by the use of the single manual control.

Referring now also to FIG. 5 of the drawings, there is provided a reflector assembly, generally designated by the numeral 100, which is positioned on the side of the condenser lenses 75 and 76 away from the carrier assembly 30. The reflector assembly 100 includes a mounting bracket, generally designated by the numeral 101, which includes a flat rectangular base plate 102 disposed parallel to the support plate 29, and provided adjacent to the rear end thereof with a laterally extending side flange 103 (see FIG. 4), and provided along the rear edge thereof with an upstanding attachment flange 104. Integral with the base plate 102 along the front edge thereof and extending upwardly and rearwardly therefrom is an inclined rectangular plate 105 disposed at an angle of substantially forty-five degrees with respect to the base plate 102. Integral with the inclined plate 105 at the upper end thereof is a short attachment flange 106. A rectangular rear plate 107 extends between the attachment flanges 104 and 106 and is fixedly secured to each by suitable means for cooperation therewith to form a rigid, substantially triangular bracket. Integral with the rear plate 107 along one side edge thereof and extending forwardly therefrom is an elongated rectangular side shield 108, provided at the forward edge thereof with a short lip extending toward the opposite side of the mounting bracket 101. The base plate 102 is pivotally mounted on the support plate 29 by means of a pivot pin 109.

Fixedly secured to the outer surface of the inclined plate 105 is a rectangular plane mirror 110, the arrangement of the reflector assembly 100 being such that the mirror 110 slopes downwardly generally toward the condenser lenses 75 and 76 at an angle of substantially forty-five degrees with respect to the support plate 29. Preferably the surface area of the mirror 110 is less than four times the area of either one of the apertures 55 and 60. There is provided an over-center spring 111, one arm of which is connected to a pin 112 carried by the side flange 103 of the base plate 102, and the other arm of which is connected to a pin 112a on the support plate 29. Also mounted on the support plate 29 adjacent to the side of the mounting bracket 101 opposite the flange 103 is a stop pin 113.

Figure 2:
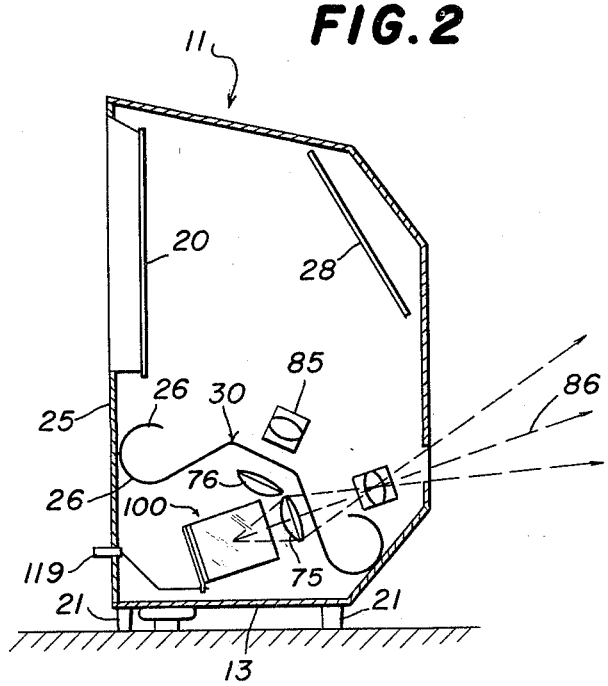
FIG. 2 is a reduced view in vertical section taken along the line 2—2 in FIG. 1, and diagrammatically illustrating the projection apparatus of the present invention in position for front screen projection on a remote screen.
Figure 3:
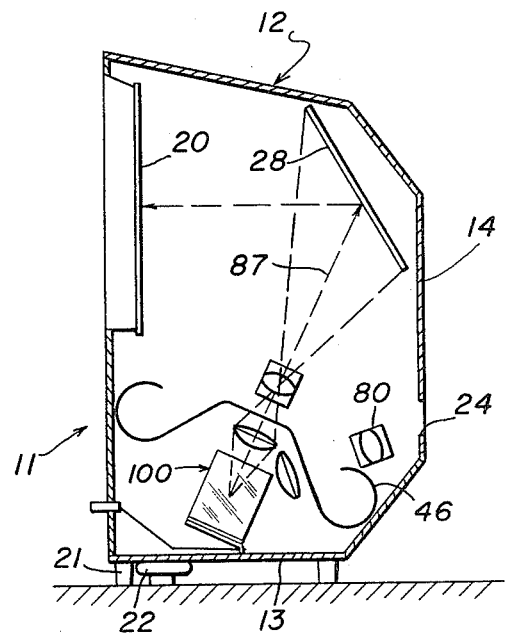
FIG. 3 is a view similar to FIG. 2, illustrating the projection apparatus in position for rear screen projection on the built-in screen.
Figure 4:
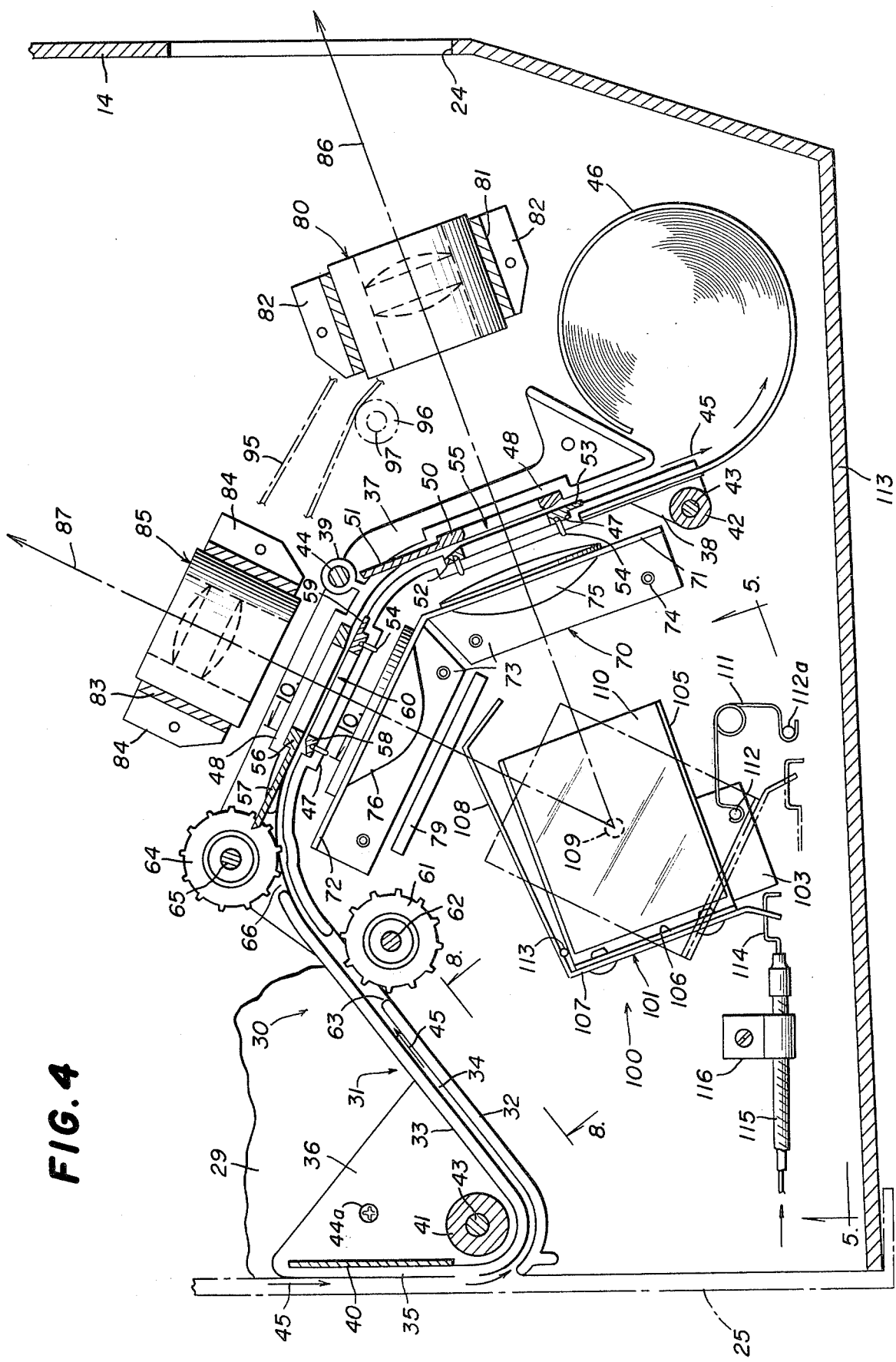
FIG. 4 is an enlarged fragmentary view in vertical section illustrating the projection apparatus of the present invention, viewed in the same direction as it is viewed in FIGS. 2 and 3.

In operation, the reflector assembly 100 is pivotally movable about the axis of the pivot pin 109 between first and second positions, respectively illustrated in FIGS. 2 and 3 and in solid line and broken line in FIG. 4, the first position being disposed for reflecting a beam of light along the optical axis 86, and the second position being disposed for reflecting a beam of light along the optical axis 87. The optical axes 86 and 87 intersect at the surface of the mirror 100 at an angle of substantially forty-four degrees, the axis of the pivot pin 109 passing through the intersection of the optical axes 86 and 87 substantially normal thereto. The mounting bracket 101 is arranged for engagement of the base plate 102 with the stop pin 113 when the reflector assembly 100 is in the first position thereof.

Connected to an attachment tab on the rear plate 107 is a coupling hook 114 of a connecting cable 115. Referring also to FIG. 6 of the drawings, the cable 115, which is a connecting wire surrounded with a wire wound sheath, extends along the support plate 29 toward the front panel 15, and inwardly along the front panel 15, between the front panel 15 and a mounting plate 117 attached thereto, being retained in position along the support plate 29 and mounting plate 117 by suitable guide clips 116. The other end of the cable 115 is secured by means of an attachment bracket 118 to an operating handle 119 which projects forwardly through a complementary opening in the front panel 15 of the projector 10 (see FIG. 1).

In operation, when the reflector assembly 100 is disposed in its first position, illustrated in FIGS. 2, 4 and 5, it may be moved to its second position by manual movement of the operating handle 119 in the direction of the arrow in FIG. 5. This will cause pivotal movement of the mounting bracket 101 in a counterclockwise direction, as viewed in FIG. 4, against the urging of the over-center spring 111, until the reflector assembly 100 has moved past the center state of the over-center spring 11, at which time the over-center spring 111 will take over and positively urge the reflector assembly 100 to its second position, being stopped in this position by engagement of the base plate 102 with the stop pin 113. This driving movement of the over-center spring 111 is accommodated by the elongated nature of the hook 114, which provides sufficient lost motion to permit the operation of the over-center spring 111. In like manner, movement of the reflector assembly 100 from its second position back to its first position is effected by moving the operating handle 119 back to the left, as viewed in FIG. 5, until the reflector assembly 100 has been pulled past the center state of the over-center spring 111, which will then continue to drive the reflector assembly back to its first position, the assembly being stopped in this position by engagement of the mounting bracket 101 with the pin 112a.

Referring to FIG. 5, there is also provided a lamp 120 mounted at the side of the reflector assembly 100 by means of a suitable support plate 122. Preferably, the lamp 120 is oriented so as to direct a beam of light onto the mirror 110 at an angle of incidence of substantially forty-five degrees, so that the reflected beam of light travels substantially parallel to the support plate 29. There is preferably provided a heat ray filter 125 which is mounted between the lamp 120 and the mirror 110, closely adjacent to the former, by a suitable mounting bracket 126, being held in place thereon by mounting clips 127. The reflector of the lamp 120 causes the light rays reflected therefrom to converge at a crossover point along the axis of the beam. Preferably, the mirror 110 is spaced from this crossover point to avoid damage to the mirror 110 by excessive heat.

In operation, when it is desired to project the filmstrip images onto a remote screen, the filmstrip 49 is first loaded into the projector 10 in the manner described above and the reflector assembly 100 is then moved to its first position, illustrated in FIGS. 2, 4 and 5, by operation of the operating handle 110, in the manner described above. It will be appreciated that the mirror 110 is so arranged with respect to the lamp 120 and the projection apparatus that, when the reflector assembly 100 is disposed in its first position, the mirror 110 reflects the beam of light from the lamp 120 along the optical axis 86 through the condenser lens 75, the aperture 55 and associated frame of the filmstrip 49, and the projection lens 80, then outwardly through the projection opening 24 in the housing 11 to the remote screen.

The filmstrip 49 may be manually fed by operation of the framing knob 67 until the first frame thereof is disposed in the aperture 55 to obtain proper positioning and focusing on the remote screen in a standard manner. In this regard, it will be appreciated that the elevation leg 22 may be extended to elevate the front of the projector 10, thereby lowering the optical axis 86 until the projected images are properly positioned on the remote screen. The film drive mechanism and the cassette drive mechanism are then turned on and the projector 10 is operated in the usual manner. It will be appreciated that when the reflector assembly 100 is disposed in its first position, the side shield 108 serves to block any portion of the reflected light beam from passing through the aperture 60 for projection onto the built-in screen 20.

When it is desired to project the filmstrip images onto the local viewing screen 20, the reflector assembly 100 is moved to its second or local position, illustrated in FIG. 3 and in broken line in FIG. 4, for reflecting the beam of light from the lamp 120 along the optical axis 87 through the diffuser 79, the condenser lens 76, the aperture 60 and the projection lens 85. The projected image is directed onto the mirror 28, and then reflected to the rear of the viewing screen 20, as illustrated in FIG. 3.

It is a significant aspect of the present invention that the positioning of the mirror 110 between the light source and the projection apparatus permits the mirror 110 to be relatively small and lightweight, and results in the positioning of the mirror 110 in the first and second positions thereof being relatively non-critical, the only requirement being that the majority of the reflected light be directed through the apertures and projection lenses. Furthermore, the optical components of the projection apparatus can be optimized for each of the two different projection modes.

Thus, for example, in the preferred embodiment of this invention, the condenser lens 75 is a biconvex lens having a focal length of about fifty-two millimeters, while the projection lens 80 is an f/3.0 lens having a focal length of about fifty-seven millimeters, both of which lenses are optimized for projection onto a remote screen. Also, it will be noted that the aperture 55 is smaller than the aperture 60 and serves to mask out the sprocket apertures and other border regions of the filmstrip frame from the projected image. On the other hand, the condenser lens 76 is preferably an aspheric lens having a focal length of about twenty-seven millimeters, and the projection lens 85 is an f/3.0 lens having a focal length of about twenty-seven millimeters, both of which lenses are optimized for projection of the film image onto the local viewing screen 20. Similarly, since the bezel of the viewing screen 20 serves as a mask for the image projected thereon, the aperture 60 may be larger than the aperture 55. It will be noted that the image projected on the remote screen travels along a straight-line unreflected path from the projection lens 80 to the remote screen, thereby further enhancing the quality of the projected image on the screen.

It will be appreciated that regardless of which projection mode is being utilized, the projected image is focused by operation of the single focusing knob 98, as was explained above Similarly, framing of the projected image is accomplished by operation of the single framing knob 67, regardless of which projection mode is being used, since the apertures 55 and 60 are spaced apart a whole number of frames of the filmstrip 49 along the path 45.

It is another significant feature of the present invention that because of the low mass and non-critical positioning of the reflector assembly 100, it may be moved between its remote and local projection positions by means of a simple and inexpensive manually-operated mechanical mechanism. It is also an advantageous feature of the present invention that the projected image is viewed in the same direction, regardless of whether the remote or local projection mode is being utilized, and the switching between the two modes can be effected without changing the position of the projector 10, except for tilting by the use of the elevation leg 22.

Preferably, the operating handle 119 for the reflector assembly 100 will be coupled to a switching mechanism (not shown) for lowering the voltage applied to the lamp 120 when the projector 10 is switched to the local projection mode, since less illuminiation is needed for projection onto the viewing screen 20 than is needed for projection onto the remote screen. This serves to extend the life of the lamp 120, which may preferably be an eighty-watt, nineteen-volt lamp having a dichroic finish reflector, although other suitable light sources may be used.

While the preferred embodiment of the invention has been illustrated with an illumination means including a fixed lamp, a movable reflector and two fixed condenser lenses, it will be understood that the essential principles of the invention could be achieved with the use of other illumination means arrangements. Thus, for example, the illumination means could comprise a lamp and condenser lens jointly movable between two positions for directing a light beam respectively through the two apertures 55 and 60. Alternatively, the arrangement could be like that illustrated in the drawings, except that only a single condenser lens would be provided which is movable with the reflector assembly 100. Another alternative to the preferred embodiment would be to eliminate the reflector assembly and simply pivot the lamp between two positions for respectively directing the light beam along the two optical axes 86 and 87. Finally, a nondirectional light source could be used without a reflector assembly, with both condenser lenses gathering light from the same nondirectional source. Other alternative arrangements may be possible, which will still achieved the essential features of two separate apertures and projection lenses optimized for the two different projection modes, and a single light source.

From the foregoing it can be seen that there has been provided an improved projection apparatus for alternatively projecting a film image onto a remote screen or a local built-in screen, while optimizing the projected image on each screen and effecting simple, inexpensive noncritical switching between the two different projection modes.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Apparatus for projecting a film image alternatively onto a remote surface and a built-in screen, said apparatus comprising a directional light source providing a beam of light, first and second non-coaxial projection lenses, a film carrier disposed between said light source and said projection lenses and having first and second apertures therethrough respectively optically aligned with said first and second projection lenses and defining a path for an associated filmstrip past said first and second apertures, and control means cooperating with said light source for effecting movement of the beam of light between a first optical path through said first aperture and said first projection lens for projection onto the associated remote surface and a second optical path through said second aperture and said second projection lens for projection onto the associated built-in screen.

2. The apparatus of claim 1, wherein said first and second apertures are spaced apart along said filmstrip path a distance equal to a whole number of frames of the associated filmstrip.

3. The apparatus of claim 1, and further including common focusing mechanism coupled to each of said first and second projection lenses and operable for effecting simultaneous focusing movement of said projection lenses.

4. The apparatus of claim 3, wherein said focusing mechanism includes first and second transmission means respectively coupled to said first and second projection lenses, and belt means interconnecting said first and second transmission means for ganged operation thereof.

5. The apparatus of claim 1, wherein said first aperture is dimensioned to provide a mask for the film image passing therethrough.

6. The apparatus of claim 1, wherein said first optical path is a direct unreflected path from said first projection lens to the associated remote surface.

7. The apparatus of claim 1, wherein said control means includes a mirror disposed between said light source and said film carrier for reflecting the beam of light toward said film carrier.

8. The apparatus of claim 7, and further including first and second condenser lenses respectively disposed in said first and second optical paths between said film carrier and said reflecting means.

9. The apparatus of claim 1, wherein the axes of said first and second optical paths intersect at an angle of substantially forty-four degrees.

10. Apparatus for projecting a film image alternatively onto a remote surface and a built-up screen, said apparatus comprising a directional light source providing a beam of light, first and second non-coaxial projection lenses, a film carrier disposed between said light source and said projection lenses and having first and second apertures therethrough respectively optically aligned with said first and second projection lenses for cooperation therewith respectively to define first and second optical paths therethrough respectively directed toward the remote surface and the built-in screen, said film carrier defining a path for an associated filmstrip past said first and second apertures movable reflecting means disposed between said light source and said film carrier for reflecting the beam of light, and control means coupled to said reflecting means for effecting movement thereof between a first position for reflecting the beam of light along said first optical path and a second position for reflecting the beam of light along said second optical path.

11. The apparatus of claim 10, wherein said reflecting means includes a plane mirror having a surface area less than four times the area of either one of said apertures.

12. The apparatus of claim 10, and further including shield means associated with said reflecting means effectively to isolate the reflected beam of light from said second optical path when said reflecting means is disposed in said first position.

13. The apparatus of claim 10, wherein said reflecting means includes a plane mirror inclined at an angle of substantially forty-five degrees to the direction of the beam of light emitted from said light source.

14. The apparatus of claim 10, wherein said first and second optical paths intersect at a predetermined acute angle, said reflecting means being adapted for pivotal movement about an axis passing through the point of intersection of said first and second optical paths.

15. The apparatus of claim 10, wherein the beam of light from said light source comprises rays converging at a crossover point, said reflecting means having a reflecting surface spaced from said crossover point.

16. The apparatus of claim 10, wherein said drive means comprises manually-operable linkage mechanism.

17. The apparatus of claim 10, wherein said linkage mechanism has a predetermined lost motion to accommodate movement of said reflecting means to said first and second positions by said over-center spring.

18. Apparatus for projecting a film image alternatively onto a remote surface and a built-in screen, said apparatus comprising a directional light source providing a beam of light, first and second non-coaxial projection lenses, a film carrier disposed between said light source and said projection lenses and having first and second apertures therethrough respectively optically aligned with said first and second projection lenses and defining a path for an associated filmstrip past said first and second apertures, movable reflecting means disposed between said light source and said film carrier for reflecting the beam of light, and control means coupled to said reflecting means for effecting movement thereof between a first position to reflect the beam of light along a first optical path through said first aperture and said first projection lens for projection onto the associated remote surface and a second position to reflect the beam of light along a second optical path through said second aperture and said second projection lens for projection onto the associated built-in screen.

19. The apparatus of claim 18, wherein said reflecting means includes a rectangular plane mirror having a surface area less than four times the area of either one of said apertures.

20. The apparatus of claim 18, wherein said apertures are fixed in position.

21. Apparatus for projecting a film image alternatively onto a remote surface and a built-in screen, said apparatus comprising a directional light source providing a beam of light, first and second non-coaxial projection lenses, a film carrier disposed between said light source and said projection lenses and have first and second apertures therethrough respectively optically aligned with said first and second projection lenses for cooperation therewith respectively to define first and second optical paths therethrough respectively directed toward the remote surface and the built-in screen, movable reflecting means disposable between said light source and said film carrier for reflecting the beam of light, and control means coupled to said reflecting means for effecting movement thereof between a first position wherein the beam of light is directed along said first optical path and a second position wherein said beam of light is directed along said second optical path.

22. The apparatus of claim 21, wherein said reflecting means is pivotally movable, said control means including an over-center spring coupled to said reflecting means and having a center state and being operable on one side of said center state positively to urge said reflecting means to its first position and operative on the other side of said center state positively to urge said reflecting means to its second position, and drive means coupled to said reflecting means for effecting movement thereof from one of said first and second positions toward the other of said positions past the center state of said over-center spring.

* * * * *